(12) United States Patent
Arling et al.

(10) Patent No.: US 11,722,744 B2
(45) Date of Patent: Aug. 8, 2023

(54) SYSTEM AND METHOD FOR A SELF ADAPTIVE MULTI-USER PROGRAM GUIDE

(71) Applicant: Universal Electronics Inc., Santa Ana, CA (US)

(72) Inventors: Paul D. Arling, Irvine, CA (US); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 318 days.

(21) Appl. No.: 16/595,023

(22) Filed: Oct. 7, 2019

(65) Prior Publication Data

US 2020/0037039 A1    Jan. 30, 2020

Related U.S. Application Data

(60) Continuation of application No. 14/949,085, filed on Nov. 23, 2015, now Pat. No. 10,499,111, which is a
(Continued)

(51) Int. Cl.
*H04N 21/482* (2011.01)
*H04N 21/422* (2011.01)
(Continued)

(52) U.S. Cl.
CPC .......... *H04N 21/4825* (2013.01); *H04N 5/76* (2013.01); *H04N 21/23109* (2013.01);
(Continued)

(58) Field of Classification Search
CPC ................. H04N 21/4825; H04N 5/76; H04N 21/23109; H04N 21/4143; H04N 21/4147; H04N 21/42204; H04N 21/4223; H04N 21/4415; H04N 21/44204; H04N 21/44218; H04N 21/44231; H04N 21/4532; H04N 21/4622; H04N 21/4753; H04N 21/482; H04N 21/47
(Continued)

(56) References Cited

U.S. PATENT DOCUMENTS 4,979,047 A   12/1990 Wine
5,550,928 A   8/1996 Lu et al.
(Continued)

FOREIGN PATENT DOCUMENTS

CN    101627382 A    1/2010

OTHER PUBLICATIONS

European Patent Office, Extended European Search Report issued on European patent application No. 13827906.2, dated Jul. 20, 2015, 10 pages.
(Continued)

*Primary Examiner* — Dominic D Saltarelli
(74) *Attorney, Agent, or Firm* — Greenberg Traurig, LLP

(57) ABSTRACT

A programming access device such as, for example, a cable or satellite set top box (STB), a digital video recorder (DVR), a personal computer, and/or a digital media receivers automatically optimizes an order of content choices presented in a content listing, such as a program guide display, favorite channel display, and/or a recording listing display based on the past viewing and/or recording history of a current user.

7 Claims, 8 Drawing Sheets

Related U.S. Application Data division of application No. 13/570,399, filed on Aug. 9, 2012, now Pat. No. 9,225,930.

(51) Int. Cl.

| | | |
|---|---|---|
| *H04N 21/442* | (2011.01) | |
| *H04N 21/414* | (2011.01) | |
| *H04N 21/462* | (2011.01) | |
| *H04N 21/475* | (2011.01) | |
| *H04N 21/4147* | (2011.01) | |
| *H04N 21/4223* | (2011.01) | |
| *H04N 21/45* | (2011.01) | |
| *H04N 21/4415* | (2011.01) | |
| *H04N 5/76* | (2006.01) | |
| *H04N 21/231* | (2011.01) | |
| *H04N 21/4143* | (2011.01) | |
| *H04N 21/47* | (2011.01) | |

(52) U.S. Cl.
CPC ..... *H04N 21/4143* (2013.01); *H04N 21/4147* (2013.01); *H04N 21/4223* (2013.01); *H04N 21/42204* (2013.01); *H04N 21/4415* (2013.01); *H04N 21/44204* (2013.01); *H04N 21/44218* (2013.01); *H04N 21/44231* (2013.01); *H04N 21/4532* (2013.01); *H04N 21/4622* (2013.01); *H04N 21/4753* (2013.01); *H04N 21/482* (2013.01); *H04N 21/47* (2013.01)

(58) Field of Classification Search
USPC ......................................................... 725/15
See application file for complete search history.

(56) References Cited

U.S. PATENT DOCUMENTS

| | | | |
|---|---|---|---|
| 5,880,768 A * | 3/1999 | Lemmons .......... | H04N 21/4821 725/41 |
| 6,182,287 B1 * | 1/2001 | Schneidewend ... | H04N 21/4755 725/48 |
| 7,954,120 B2 | 5/2011 | Roberts et al. | |
| 8,001,561 B2 | 8/2011 | Gibbs | |
| 8,698,840 B2 * | 4/2014 | Yeh ..................... | H04N 21/431 345/589 |
| 8,712,218 B1 | 4/2014 | Begeja et al. | |
| 8,918,088 B1 | 12/2014 | Thodupunoori | |
| 2002/0061185 A1 | 5/2002 | Hirabayashi et al. | |
| 2002/0174430 A1 | 11/2002 | Ellis et al. | |
| 2003/0084448 A1 | 5/2003 | Soundararajan | |
| 2003/0149988 A1 | 8/2003 | Ellis et al. | |
| 2004/0154040 A1 | 8/2004 | Ellis | |
| 2004/0230994 A1 | 11/2004 | Urdang | |
| 2005/0240661 A1 | 10/2005 | Heller et al. | |
| 2005/0267750 A1 | 12/2005 | Steuer | |
| 2006/0184967 A1 | 8/2006 | Maynard et al. | |
| 2006/0259926 A1 * | 11/2006 | Scheelke ............ | H04N 7/17318 725/48 |
| 2007/0157282 A1 | 7/2007 | Park et al. | |
| 2007/0169148 A1 | 7/2007 | Oddo et al. | |
| 2007/0240179 A1 | 10/2007 | Lavigne | |
| 2008/0022309 A1 | 1/2008 | Begeja et al. | |
| 2008/0095515 A1 | 4/2008 | Miyamoto | |
| 2009/0100463 A1 | 4/2009 | St. John-Larkin | |
| 2009/0158341 A1 | 6/2009 | Miller | |
| 2009/0165036 A1 | 6/2009 | Berry | |
| 2010/0220972 A1 | 9/2010 | Bryan | |
| 2010/0251304 A1 | 9/2010 | Donoghue et al. | |
| 2011/0135281 A1 | 6/2011 | Meare | |
| 2012/0017179 A1 * | 1/2012 | Yoon .................. | H04N 21/4438 715/838 |
| 2012/0204201 A1 * | 8/2012 | Cassidy ........... | H04N 21/44222 725/10 |
| 2012/0233640 A1 * | 9/2012 | Odryna .............. | H04N 21/4622 725/45 |
| 2013/0218905 A1 | 8/2013 | Sankarasubramaniam et al. | |
| 2013/0346875 A1 | 12/2013 | Klein | |

OTHER PUBLICATIONS

ISA/US, International Search Report and Written Opinion issued on PCT Application No. US2013/052944, 21 pages.
SIPO, Office Action issued on Chinese patent application No. 201380047459.0, 8 pages.
Brazilian Patent Office, Preliminary Office Action issued on Brazilian patent application No. BR112015002719-9, 2 pages.
United States Patent and Trademark Office, Non-Final Office Action issued in U.S. Appl. No. 16/800,787, dated Feb. 3, 2021, 10 pgs.
U.S. Patent and Trademark Office, Final Office Action issued in U.S. Appl. No. 16/800,787, dated May 12, 2021, 11 pgs.
U.S. Patent and Trademark Office, Final Office Action issued in U.S. Appl. No. 17/546,623, dated Jan. 11, 2023, 12 pgs.
U.S. Patent and Trademark Office, Non-Final Office Action issued in U.S. Appl. No. 17/546,623, dated Sep. 13, 2022, 11 pgs.

* cited by examiner

User viewing history

DVR content directory

SYSTEM AND METHOD FOR A SELF ADAPTIVE MULTI-USER PROGRAM GUIDE

RELATED APPLICATION INFORMATION

This application claims the benefit of and is a continuation of U.S. application Ser. No. 14/949,085, which application claims the benefit of and is a divisional of U.S. application Ser. No. 13/570,399, filed on Aug. 9, 2012, the disclosures of which are incorporated herein by reference in their entirety.

BACKGROUND

This invention relates generally to improved methods for display of media content listings such as program guides and/or DVR directories. In this regard, the growing volume of media content available to consumers via cable/satellite, Internet, DVR, etc., increasingly necessitates some means of prioritizing a program guide information listing to match the requirements of a particular user. Contemporaneously, multi-room cable/satellite installations, advances in DVR capacity, etc., are resulting in both an increased number of users per household and increasing instances of concurrent media consumption at multiple locations within a household. Additionally, the deployment of "whole house" systems in which a high capacity central DVR is shared amongst multiple TVs may result in an increased number of different users initiating recording requests to a single DVR system. Accordingly, it is desirable to dynamically personalize program guide and/or favorite channel listings to match the particular requirements of a requesting user. While existing methods are available to perform such personalization, some on a per-user basis for multi-user systems, many of these methods are complicated in use and/or require considerable user involvement in configuring and setting up a system for use.

SUMMARY OF THE INVENTION

A media access device such as, for example, a cable or satellite set top box (STB), a DVR, a personal computer, digital media receiver, and/or the like, may automatically optimize the order of content choices presented in a content listing, such as a program guide or favorite channel display, based on the past viewing history of a current user. Similarly, the media access device may arrange the display of a content listing related to an integrated or associated DVR device so as to give priority to those entries within the content listing corresponding to recording requests which were originated by a current user.

For the purposes of this invention, a current user may be determined using any convenient method, for example via user-specific remote controls which may be either stand-alone devices or remote control apps installed on smart phones, tablets, game controllers or similar devices (collectively hereafter "smart devices"); by provision of one or more remote controls adapted to utilize biometric information to identify the current user, for example fingerprint detection, voice recognition, or hand tremor pattern recognition; by provision of a camera together with facial recognition software accessible to the media access device; via explicit user identification by way of a button input, log-in, menu choice, or the like; or any other appropriate method.

When provisioned with user identification means as above, a media access device in accordance with the instant invention may log the actual amount of time spent watching each channel or other content source by each individual user. In this regard, a media access device may use, for example, TV power status obtainable over an HDMI interface, audio return channel monitoring, power line current sensing, etc., to enhance the accuracy of the captured data by ensuring that viewing time is only accumulated while the TV is actually "on." If available as part of the TV status, for example via an HDMI interface, the media access device may further verify that the currently selected TV input is that to which media access device output is connected.

In some embodiments, the media access device may also capture and log time/date information in order to further refine program guide or favorite channel display order based on time of day, day of week, or season, e.g., conventional time seasons, sports seasons, or the like. As will be appreciated, in some embodiments program guide displays may not be limited to listing only broadcast content but may include listings from multiple content sources, e.g. broadcast, cable/satellite on demand, DVR recordings, Internet streams, etc.

Additional features which may be available in certain embodiments may include associating a specific user with a smart device's MAC or other physical ID so that DVR recording requests initiated remotely via that smart device (e.g., over the Internet) may be correctly tagged for subsequent display; adjusting DVR and/or program guide displays to produce a "blended" display order in cases where one user frequently plays back another user's recording requests; identification of specific groups of users (e.g., via use of facial recognition) for example "family group", "kids present", etc., and adjusting the displayed favorites, recordings, and/or channel line-up accordingly; etc.

A better understanding of the objects, advantages, features, properties and relationships of the claimed invention will be obtained from the following detailed description and accompanying drawings which set forth illustrative embodiments and which are indicative of the various ways in which the principles of the claimed invention may be employed.

BRIEF DESCRIPTION OF THE DRAWINGS

For a better understanding of the various aspects of the claimed invention, reference may be had to preferred embodiments shown in the attached drawings in which:

DETAILED DESCRIPTION

Figure 1:
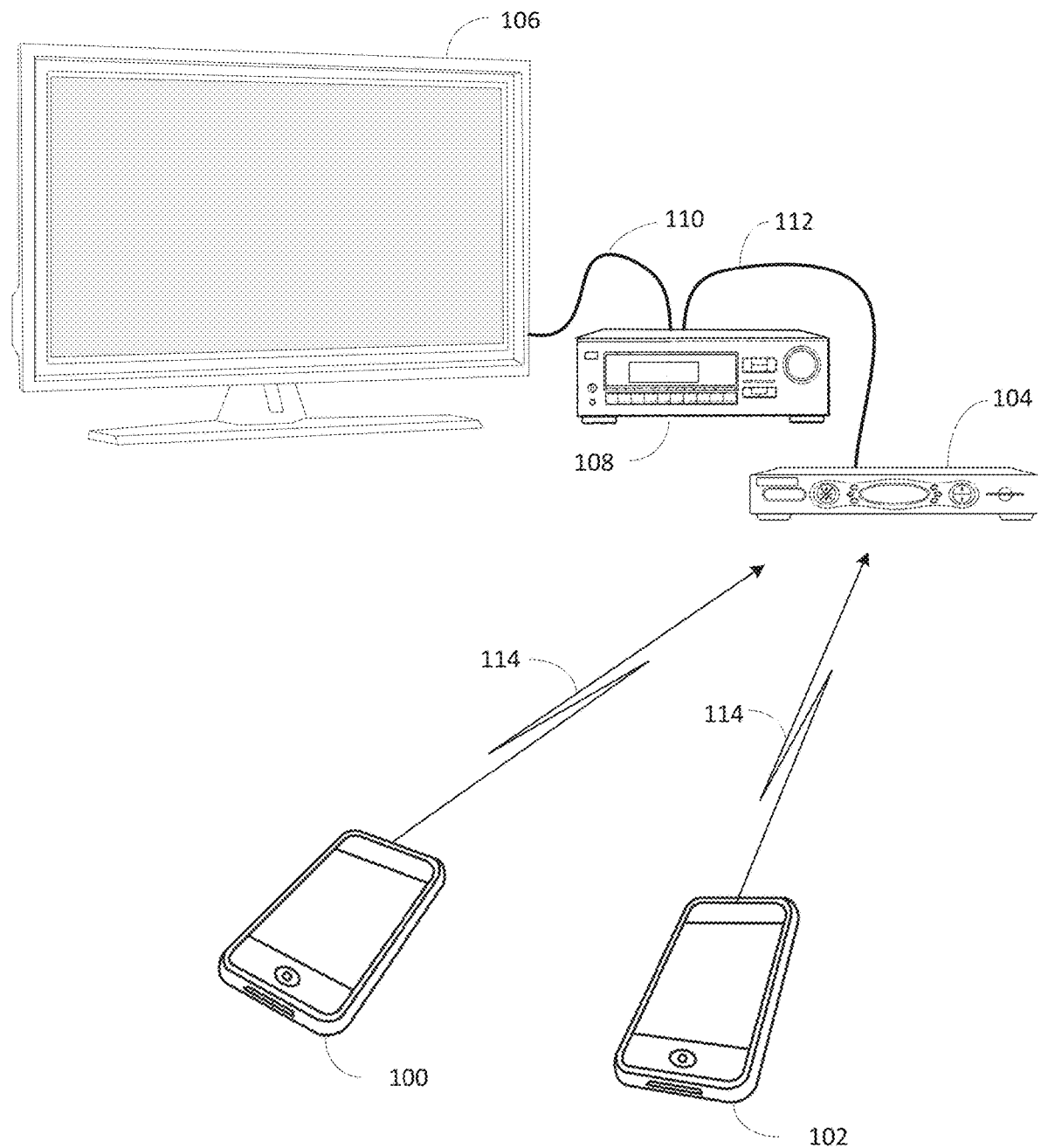
FIG. 1 illustrates an exemplary system in which the methods described hereinafter may be utilized.

With reference to FIG. 1, the methods described herein may be used in conjunction with an exemplary system comprised of a cable or satellite set top box ("STB") 104, with or without an integrated digital video recorder ("DVR"). As illustrated in FIG. 1, one or more individual smart devices 100,102 such as an iPhone®, iPad®, Android™ device, etc. may be STB 104, TV 106, AV receiver 108, etc. Examples of smart device remote control apps may be found in co-pending U.S. patent application Ser. No. 12/406,601 or 13/329,940.

Communication 114 from a smart device 100,102 to STB 104 may take the form of any convenient infrared (IR), radio frequency (RF), hardwired, point-to-point, or networked protocol, as necessary to cause the respective target appliances to perform the desired operational functions. By way of example, an IR signal may be transmitted to STB directly as described in co-pending U.S. patent application Ser. No. 13/043,915 or via an intermediate relay device (not illustrated) such as described in co-pending U.S. patent application Ser. No. 13/071,661; an RF communication may comprise any of RF4CE, Bluetooth, WiFi, etc., as appropriate for the particular STB.

In keeping with the teachings set forth herein, STB 104 may be capable of adapting content listings, such as program guide displays, DVR recording listings, etc., in accordance with which one of multiple smart devices is currently being used to control it—for example, which smart device issued the command that initiated the display of a content listing.

STB 104 may be connected to TV 106 using an HDMI interface. The HDMI connection may be via an intermediate switching device such as an AV receiver 108 (HDMI cables 110,112) or may be direct as illustrated at 210 in FIG. 3.

Figure 2:
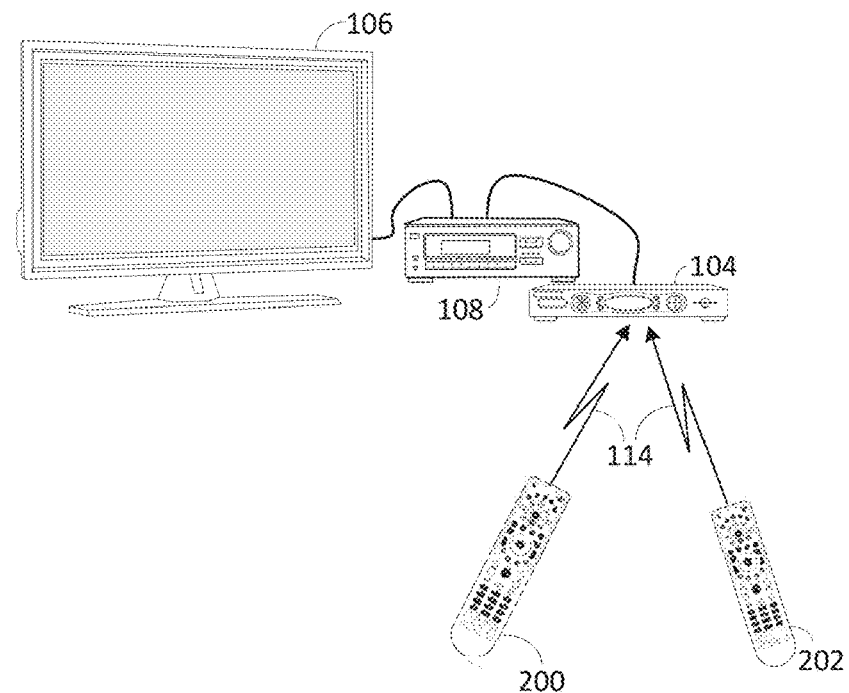
FIGS. 2 and 3 illustrate further exemplary systems in which the methods described hereinafter may be utilized.

FIG. 2 illustrates an alternative method for controlling STB 104 in which user identification may be achieved via conventional remote controls 200,202 constructed for example as described in co-pending U.S. patent application Ser. No. 13/225,635, e.g., each remote may be adapted to include unique identity information data in every command transmission to STB 104. Assigning each of these remotes to a specific user may thus enable STB 104 to distinguish between users for the purposes described herein. In alternative embodiments, remote controls 200,202 may utilize biometric user identification techniques, e.g. fingerprint recognition, hand tremor pattern matching, voice recognition, etc.

Figure 3:
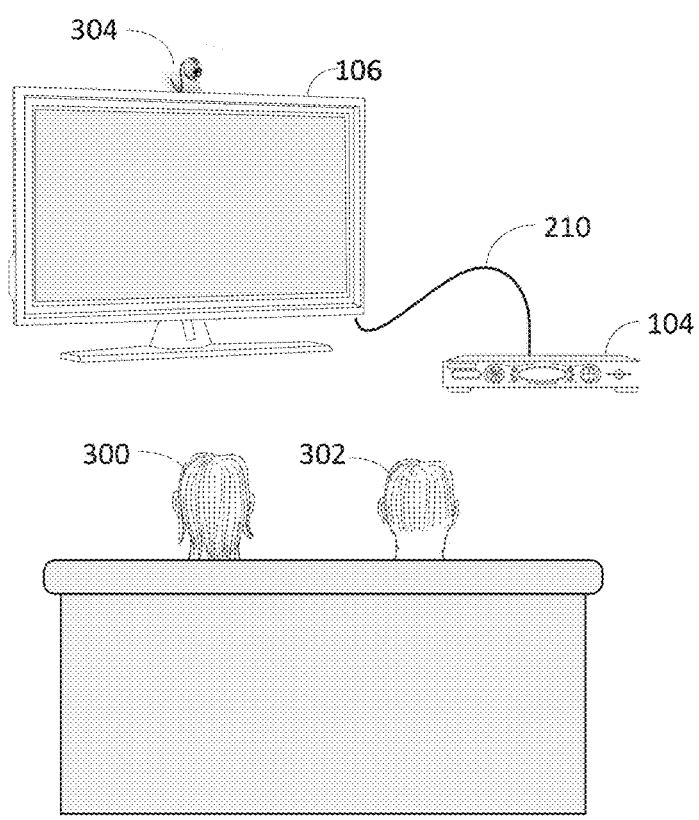

FIG. 3 illustrates a yet further embodiment in which a camera 304 provides input to facial recognition software in STB 104 for the purpose of distinguishing which of one or more users 300,302 are currently present in the viewing environment.

It will be appreciated that the viewer identification techniques described above may also be used in combination, for example a mixture of conventional remotes such as 200 with a smart device 100 assigned to the same or different users; a combination of a physical remote 200 which determines a "primary" viewer together with camera-based recognition of other viewers present (e.g. family members); etc.

Figure 4:
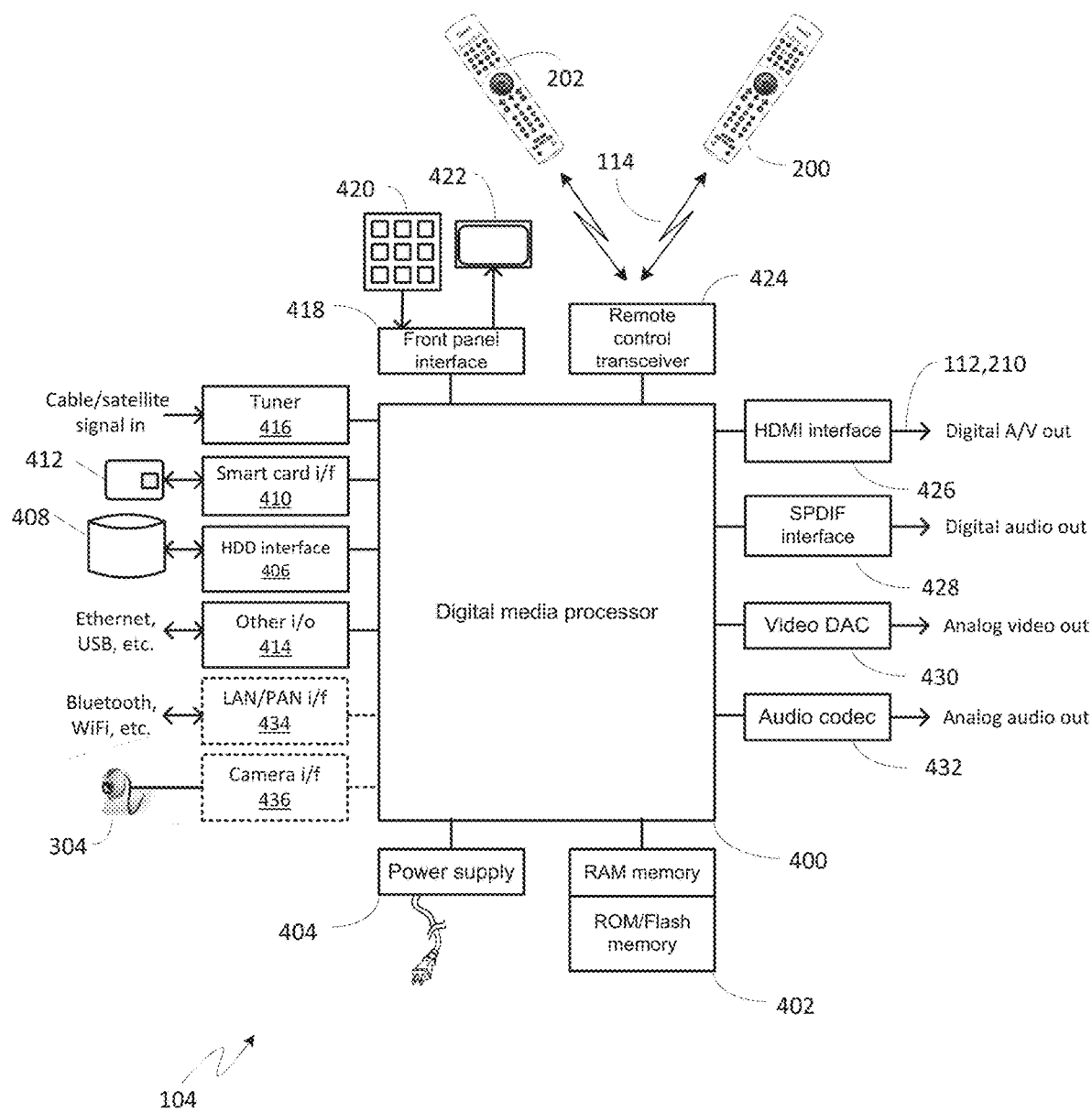
FIG. 4 illustrates a block diagram of exemplary components of the exemplary STB device of FIG. 1, 2 or 3.

Turning now to FIG. 4, exemplary STB 104 may include, as needed for a particular application, a processor 400 coupled to a memory 402 which may comprise RAM, ROM, and/or Flash memory; a power supply 404; a hard disk (HDD) interface 406 and associated disk drive 408, for example to support DVR functionality; a smart card and/or PCMIA interface 410 where required to accommodate service enablement/decryption cards 412; other input/output interfaces 414 such as USB, Ethernet, etc.; a front panel interface 418 with associated front panel keypad 420 and display means 422; a remote control receiver or transceiver 424 for reception of signals from a controlling device such as 200 or 202; a digital audio/video output interface 426 such as an HDMI port; a digital audio output 432 such as an SPDIF connection; analog video and audio outputs 430,432; and one or more tuners 416 for receiving and demodulating a cable or satellite signal. As will be appreciated, in general tuner 416 may be capable of receiving both one or more digital media streams comprising program content and a so called out-of-band data stream comprising, for example, program guide information, software updates, etc.

Optionally, as required for a particular embodiment, STB 104 may include a wireless LAN and/or PAN interface 434 supporting communication over Bluetooth, WiFi and/or WiFi Direct links. As will be appreciated, when so equipped, in certain embodiments STB operational commands may be received via wireless interface 434, for example from a smart device such as 100, in place of or in conjunction with command transmissions received via remote control transceiver 424.

In certain embodiments, Ethernet and/or WiFi interfaces 414, 434 (or any other appropriate method) may be used to network together a group of STBs, for example to allow multiple TVs in a household to access a centralized DVR capability.

Additionally, in some embodiments a camera and/or a camera interface 436 may be provided for use in video telephony applications, for viewer recognition purposes as described herein, etc. It will be appreciated that in alternative embodiments a camera may be interfaced via wireless network interface 434.

As is known in the art, programming instructions may be stored in a non-transitory readable memory 402 ("STB programming") which when executed by processor 400 may enable the STB appliance 104 to receive and decode digital media streams and data streams including for example program guide information from tuner 416; to store received media content and data on HDD 408 or in memory 402; to output received (from tuner 416) or retrieved (from HDD 408) media content via one or more of the output ports 426,428; to monitor other I/O ports 414 for activity; to receive, decode, and act upon user commands received from a controlling device 200 or input via front panel 420; to display content listings, such as one or more of program guide information, listings of stored content, listings of favorite channels, etc.; to display setup and configuration menus at user request and act upon any resulting user input; etc. As will described hereafter, STB 104 may also include STB programming for monitoring the viewing habits and DVR recording requests of multiple users and utilizing the information gathered to prioritize, filter, and/or otherwise arrange program guide and/or DVR content displays.

Connection of HDMI interface 426 of STB 104 to an appliance such as TV 106 as illustrated in FIGS. 1, 2 and 3 may enable exchange of digital information between these appliances in accordance with, for example, the Extended Display Identification Data (EDID), Consumer Electronics Control (CEC), and/or High-bandwidth Digital Content Protection (HDCP) standards. By way of explanation, EDID defines data which may be provided by a digital display appliance such as TV 106 to a video source such as STB 104 to characterize the capabilities and configuration of the display device; CEC defines methods by which appliances may exchange command and control information over an HDMI link; and HDCP provides a method for appliances to authenticate one another and exchange encryption keys in order to effect secure transmission of digital AV media content. Since all of these standards are readily available from their respective standards-setting bodies, for the sake of brevity the full features and functionality thereof will not be presented herein in detail. For the purposes of the instant invention in particular, such a connection may enable the STB programming of STB 104 to determine the "power on" or "power off" state of TV 106, and in some instances, whether the specific HDMI input of TV 106 to which STB 104 is connected is in fact currently selected as the input media stream being rendered on the screen of TV 106.

Figure 5:
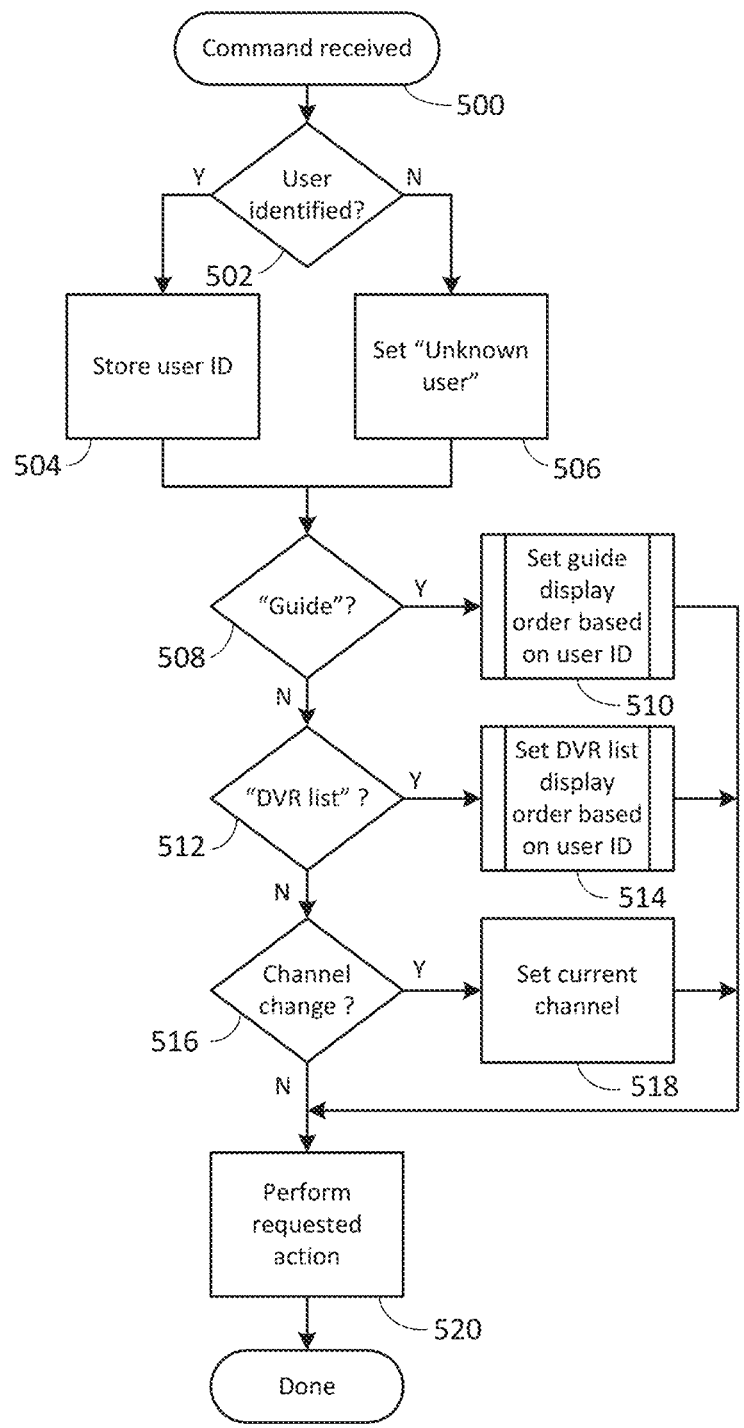
FIG. 5 illustrates by way of flowchart an exemplary series of steps which may be performed by the programming of the STB of FIG. 1, 2, or 3 when processing a user-initiated command.

FIG. 5 illustrates in flowchart form a series of actions which may be performed by the STB programming of an exemplary STB 104 upon executing a command. Note that in this context "executing a command" constitutes an action to be performed by the STB, e.g., an action may comprise a response to one or more commands received as a result of button presses on an associated remote control or may comprise an internally generated action. Without limitation and by way of example only an action may be causing a display of a content listing, such as a program guide listing, in response to a single button press of a "Guide" key on the associated remote control or causing the STB to tune to channel 206 in response to a sequence of button presses of a "2", "0", and "6" key on the associated remote control, tuning to a particular channel in response to a user's selection of an item from a program guide display, and the like.

Upon receipt of a command at step 500 (whether received from on external source of generated internally by the STB), at step 502 the STB programming may first determine if the current user has been identified or is identifiable. User identification may be performed using any convenient technique or combination of techniques as appropriate for a particular embodiment, for example: provision of user-specific remote controls (i.e., each user has their own remote adapted to transmit a unique identity as a portion of its signal) as described in co-pending U.S. patent application Ser. No. 13/225,635; use of individual smart devices equipped with a remote control app, for example as described in co-pending U.S. patent application Ser. No. 13/329,940, whereby a unique smart device ID (serial number, MAC address, etc.) may be used to identify individual users; provision of one or more remote controls adapted to utilize biometric information to identify a current user, for example fingerprint detection or voice recognition as described in U.S. Pat. No. 6,256,109, or hand tremor signature recognition for example as described in U.S. Pat. No. 7,236,156; provision of a camera together with facial recognition software installed as part of the STB programming of STB 104 or on an associated device, for example as described in U.S. Pat. No. 5,771,307 or U.S. patent application Ser. No. 10/663,106; explicit user identification of themselves via a button input, menu choice, provision of log-in information, or the like when initiating a viewing session; or any other available method.

If the current user is identifiable, at step 504 the user ID is stored for use in subsequent steps. If not (for example if the command was received from a generic aftermarket universal remote without user identification capability) at step 506 an "unknown user" status may be set. Depending upon the embodiment, the actions of an unknown user may be tracked to provide default actions in the steps that follow, or may be ignored for tracking purposes.

Figure 6:
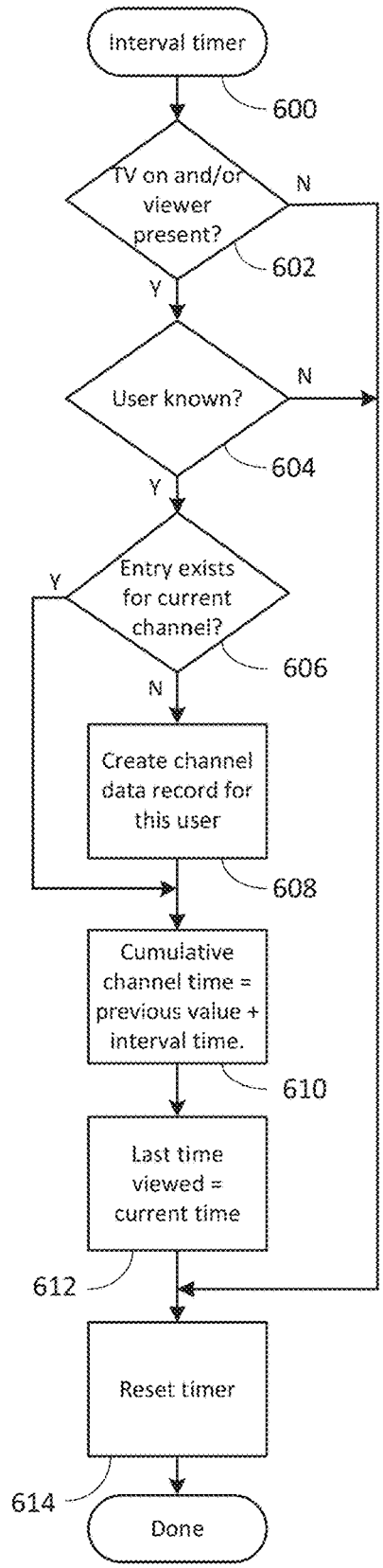
FIG. 6 illustrates by way of flowchart an exemplary series of steps which may be performed by the programming of the STB of FIG. 1, 2, or 3 in order to capture and log user viewing histories.
Figures 7, 8:
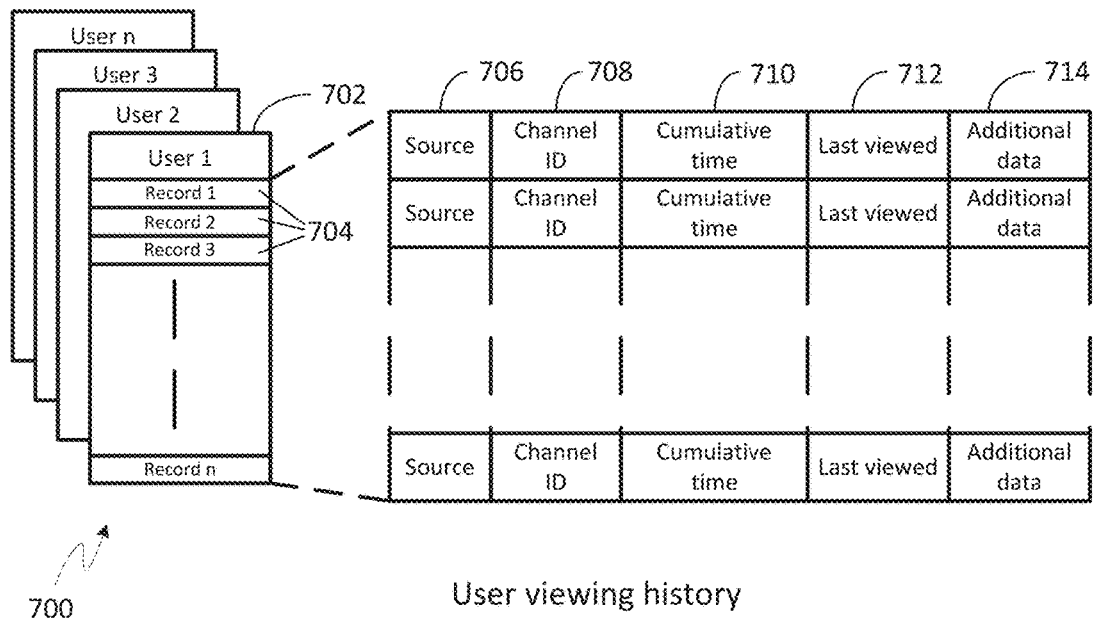
FIG. 7 illustrates an exemplary data structure which may be used for recording user viewing history.
FIG. 8 illustrates an exemplary data structure which may be used to manage DVR recording requests.
Figure 9:
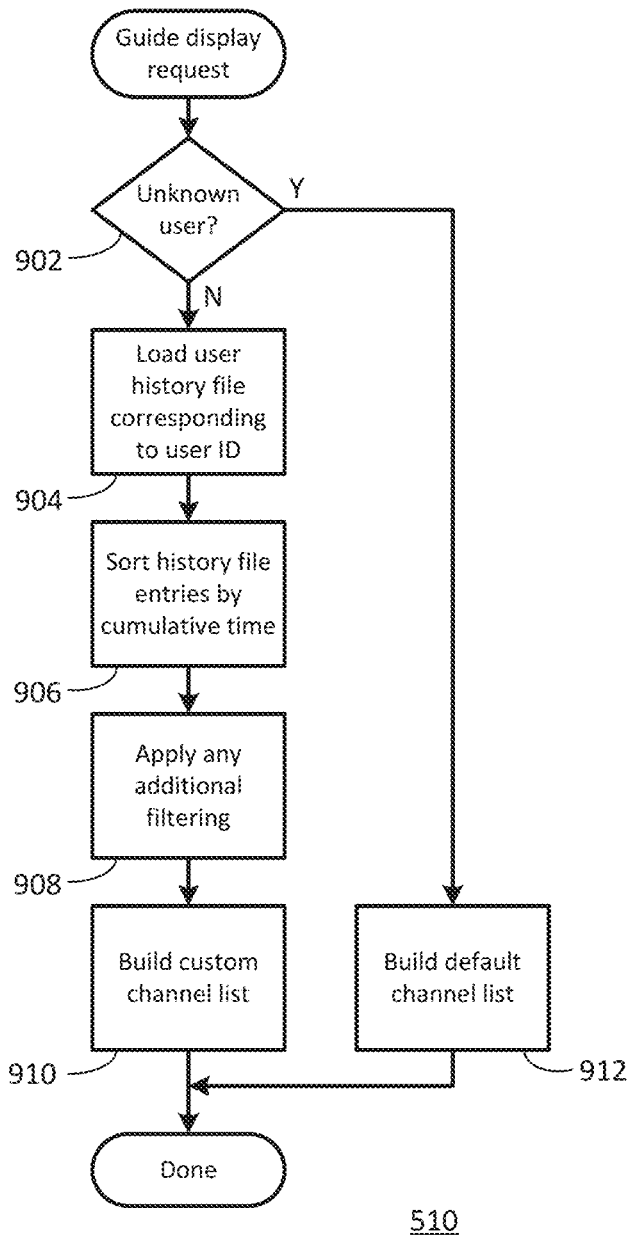
FIG. 9 illustrates by way of flowchart an exemplary series of steps which may be performed by the programming of the STB of FIG. 1, 2, or 3 when processing user initiated program guide display requests.

If at step 508 it is determined that the received command is a request to initiate a program guide display, at step 510 the information that is presented in the content listing, e.g., the channels and/or other available content items, may prioritized as described hereafter in conjunction with FIG. 9 considering the current user's viewing history, gathered as described hereafter in conjunction with FIGS. 6 through 8. Similarly, if at step 512 it is determined that the request is to initiate display of previously recorded DVR content, at step 514 DVR entries which correspond to recording requests which were initiated by the current user may be given priority in the resulting content listings display. As will be appreciated, in some embodiments DVR content may also be incorporated into the display of program guide listings, either automatically or by user request. In some embodiments, the DVR content may be placed at the top of a content listing over program guide information when the system is operating in a DVR control mode, e.g., the remote control is in a DVR control mode, and may be placed at the bottom of a content listing following program guide information when the system is operating in a TV, Satellite, Cable, or the like mode, e.g., the remote control is a TV, Sat, Cable, or the like mode. Additionally, a DVR content listing may be filtered, e.g., comprise only recordings attributable to the current user and/or comprise only recordings suitable for the current user (e.g., considering content ratings or the like); and/or may be prioritized, e.g., encompass all recorded material, but with recordings attributable to or frequently viewed by the current user appearing first in the displayed listing or being otherwise made more visually prominent. Depending on the particular embodiment the style of DVR listing presentation, filtered and/or prioritized, may be predetermined by design or may user configurable, either globally for all users or on a per-user basis.

If at step 516 it is determined that the received command is a request to change to a new channel or to a different media stream, the identity of the new channel or media stream may be stored at step 518 for reference during the viewing history accumulation process as will be described hereafter in conjunction with FIG. 6. Thereafter, at step 520 the requested action may be performed by the STB programming and command execution is complete.

FIG. 6 illustrates in flowchart form a series of actions which may be performed by the STB programming of exemplary STB 104 to accumulate user viewing history data, stored for example as illustrated in FIG. 7. Referring first to FIG. 7, the STB programming may maintain a set of viewing history data files 700 corresponding to each separately identifiable user of the system. In certain embodiments, an additional data file for an "unknown," or default, user may also be maintained. It will be appreciated that in suitably equipped systems, for example where facial recognition is available, a "user" in this context may also comprise a group of individuals, for example "dad" may be one user, and "dad and kids" may be a different user. Detection of viewing groups may also be possible in systems where a wireless network protocol such as Bluetooth or WiFi is used in conjunction with user's smart devices to provide STB control: in those instances the contemporaneous presence of multiple smart devices on a local network may be used to derive the identity of a user group.

As illustrated, each individual user history file 702 may comprise a series of records, each record 704 comprising a series of fields, for example:

Content source identity 706. By way of example possible content sources may include cable or satellite channels accessible via tuner 416, Internet content accessible via Ethernet 414 or WiFi 434 interfaces, previously recorded DVR material accessible from HDD 406, etc.

Channel ID 708. By way of example, possible channel IDs may comprise a cable system channel number, a URL, a DVR directory entry, etc. as appropriate for the content source 706 associated with that record.

Cumulative viewing time 710 for this user, which may be accumulated as described hereafter.

Last viewed time 712, which may comprise the absolute time and date of the last viewing of this particular content source and channel by this particular user, maintained in some embodiments to allow for removal of and/or modification of stale entries by the STB programming.

In some embodiments, additional information 714 regarding viewing habits may be captured and used to further refine selection or prioritization of items for content listing display. By way of example and without limitation, field 714 may contain several subfields corresponding to time of day, day of week, and/or month of year; which may be used to accumulate data for use in further optimizing program guide displays based on daily, weekly, or seasonal factors.

In order to track and capture user viewing history, the STB programming of STB 104 may utilize a timer function to periodically inspect and capture the state of the system. This timer period may be any convenient value suitable for providing an appropriate level of granularity to the captured data while not imposing an overly large processing burden on the STB. In one exemplary embodiment, the timer period may be of the order of several minutes. It will also be appreciated that in some embodiments the timer interval may be variable: for example, the timer interval may be reduced (or lengthened) for several cycles immediately following execution of a channel change command in order to better detect and accurately capture (or disregard) channel surfing activity in which a user may only dwell on a particular content stream for a short period of time.

Returning now to FIG. 6, upon timer expiry 600, at step 602 the STB programming may first determine if TV 106 is in fact powered on and, when determinable, rendering STB-supplied content. Such a determination may be made using any convenient method, for example TV status as reported over HDMI interface 426; TV power monitoring by the STB itself or by an external device such as described for example in U.S. Pat. No. 6,870,463; inspection of simulated state of TV 106 maintained as described for example in U.S. Pat. No. 7,126,468 or 6,784,805; etc. Additionally, in embodiments where viewer presence detection is available, for example via a camera interface 436 on STB 104; by detection of the presence of a user's smart device on a local network; via passive infrared detection; etc., the user presence status may also be ascertained at this step. If the TV is not on or no viewer is present, no further action is required, the timer is reset at step 614, and processing is concluded.

If TV 106 is powered on and viewer(s) are present (if presence is utilized), at step 604 the STB programming may next determine if the current user is known to the system (i.e., a valid user ID was stored at step 504 of FIG. 5 when executing the last user command received by STB 104). If not, processing concludes as before. If so, at step 606 the STB programming may next determine if a record 704 corresponding to the current channel (i.e., the source and channel ID value last stored at step 518 of FIG. 5 when executing a channel or media stream change command) already exists in the individual viewing history file 702 of the current user. If not, at step 608 a new record may be created. Thereafter, at step 610 the cumulative viewing time 710 for that record may be incremented, for example by adding the elapsed timer value to any current value in field 710 and storing that new value, and the last viewed field 712 may be updated by storing the current date/time into field 712. In those embodiments where they exist, additional data field(s) 714 may be updated as well. Thereafter, at step 614 the timer is reset, and processing is concluded.

As will be appreciated, in order to ensure optimal performance, the STB programming of STB 104 may periodically engage in data maintenance or "housekeeping" activity with respect to the user viewing history files. Scheduling of such activity may be on a calendar basis, e.g., weekly or monthly; may be on an elapsed time basis, e.g., after a predetermined number of active viewing hours have been logged; may be by explicit user request; may be based on a combination thereof; or may be on any other basis appropriate for a particular embodiment. Maintenance activity may comprise for example removal of stale records 704, e.g., those with a "last viewed" date older than a certain date, which date may be a predetermined value or may be dynamically determined based on system resources such as available memory, those that have a date, are related to content genre, etc. that are no longer in season, and the like. Alternatively, in some embodiments stale records may not be removed immediately, but may rather be subjected to a gradual downgrading process, for example by a step-wise reduction in accumulated time value 710, which, as will become apparent, may cause the corresponding channel ID to appear increasingly lower in the program guide listing display.

FIG. 8 illustrates an exemplary DVR content directory 800 which may be used in conjunction with the methods described herein. Within this DVR content directory, each entry 802 corresponds to a single recorded or to-be-recorded item and comprises a series of fields as follows:

Item ID field 804 may comprise a unique item identifier, which may be used for example to populate a channel ID field 708 in a user viewing history record 704 when source device field 706 is "DVR".

Requesting user field 806 may be the user ID of the user requesting the recording, for example the user ID captured at step 504 of FIG. 5 during input of the recording request command.

Status field 808 may reflect the current status of this request within the DVR system, for example "Successfully recorded", "Yet to be recorded", "Recording in progress", "Recording error", etc. In some embodiments, the status field 808 may also reflect if a user has watched a recorded program.

Title field 810 may contain the title of the content, which, for example, may be derived from the program guide information stored in STB memory at the time the recording request was initiated.

Source/channel field 812 may contain the content source and channel ID from which the desired content was or is to be recorded.

Date field 814, start time field 816, and end time field 818 may define the recording instance, which as before may be derived from the program guide information stored in STB memory at the time the recording request was initiated. It will be appreciated that the contents of date field 814 may also include an indication of that the request is for "series recording," i.e., all episodes of a recurring program are to be recorded. By way of example, one method for implementing such a feature may comprise automatically inserting a further entry 802 into the DVR content directory 800 each time an existing series recording request is completed (i.e., when updating status field 808 to "Successfully recorded").

Other information field 820 may contain, as appropriate for a particular embodiment, additional information regarding the content (e.g., release date, cast members, etc.) and/or DVR housekeeping information (e.g., HDD directory pointers, retention period settings, etc.). Additionally, in certain embodiments other information may include subfield(s) for storing the user IDs of secondary users, e.g., users who, although not the originators of the recording request, may have viewed or otherwise expressed interest in this item of content. As will be appreciated, in the case of series recording requests, such additional user information may also be propagated forward as future recording request entries are generated.

For filtering purposes, it is also contemplated that the system may capture genre and/or ratings information for a recorded program. In this manner, for example, the genre and/or ratings information can be utilized to filter information within a displayed content listing based upon a viewing permission level for that user thus providing a form of parental control.

With reference to FIG. 9, processing of a user a request for display of a program guide listing by the STB programming of STB 104, for example as may occur at step 510 of FIG. 5, may comprise the following steps:

At step 902, STB programming may first determine if the current user is unknown. If so, at step 912 the default action established for that condition may be taken. This may comprise, for example, simply arranging the information in a displayed content listing, e.g., a program guide, in ascending or descending channel number sequence; prioritizing the information if a displayed content listing as described hereafter using a default viewing history that has been maintained for "unknown user;" using a content provider supplied preferred order; or any other arrangement as appropriate for a particular embodiment.

If the current user is known, at step 904 the STB programming may retrieve the user history file 702 corresponding to the current user. At step 906, the individual entries 704 of the retrieved history file may be arranged in descending order of accumulated viewing time 710. At step 908 any additional filtering factors may be applied to further adjust the order of the sorted entries, for example without limitation, a factor derived from the "last viewed" information field 712 may be applied to promote more recently viewed items over older entries; time/date information from additional data 714 (where available) may be compared to the current time/date in order to adjust for daily, weekly or seasonal factors; etc.

Thereafter, at step 910 the source and channel ID fields 706,708 from the newly-ordered viewing history data may be used to prioritize an order in which the information within a content listing is displayed, i.e., to thereby provide a user-specific order to the listing of the content of the program guide that is caused to be displayed, for example, during the execution of step 520 of FIG. 5.

Figure 10:
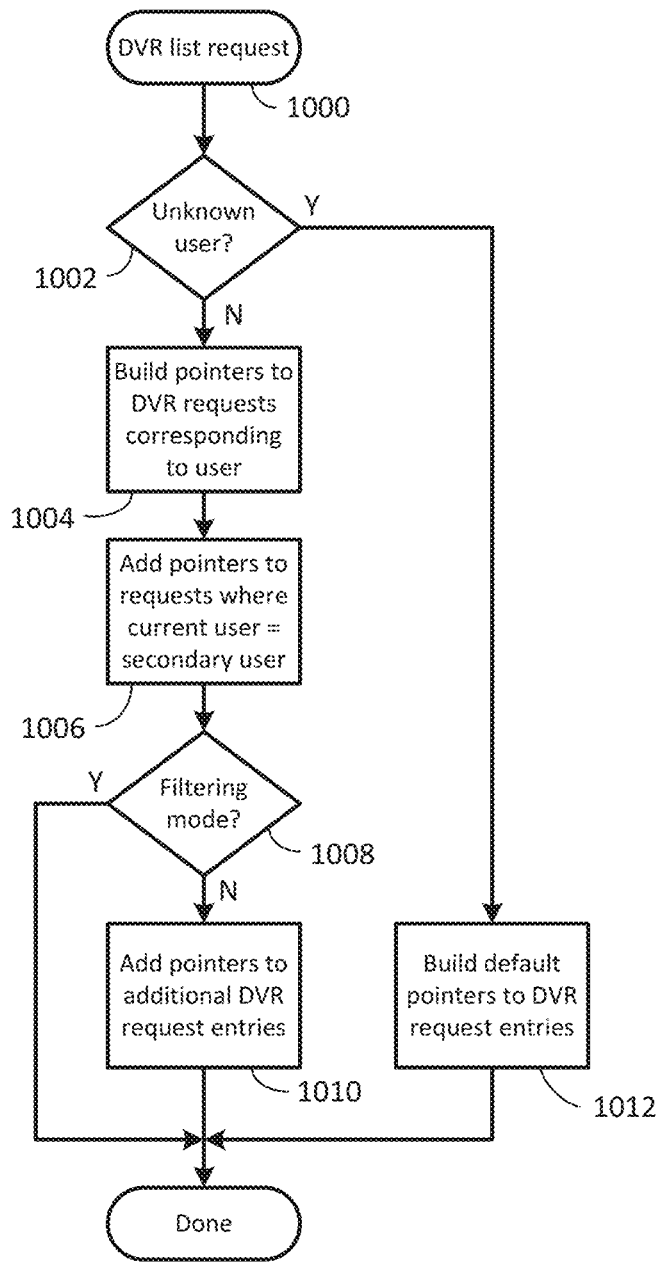
FIG. 10 illustrates by way of flowchart an exemplary series of steps which may be performed by the programming of the STB of FIG. 1, 2, or 3 when processing user initiated requests to list DVR contents.

With reference to FIG. 10, processing of a user request for display of a listing of available DVR content by the STB programming of STB 104, for example as may occur at step 514 of FIG. 5, may comprise the following steps:

At step 1002, STB programming may first determine if the current user is unknown. If so, at step 1012 the default action for that condition may be taken, for example preparing to list all DVR content in chronological or alphabetical order; preparing to list only content corresponding to DVR content directory entries 802 in which the requesting user field 806 is set to "unknown;" or any other arrangement as appropriate for a particular embodiment.

If the current user is known, at step 1004 the STB programming may initially build a set of pointers to a subset of DVR content directory entries corresponding to only those items for which the requesting user field 806 matches the current user and in which status field 808 contains the status "Successfully recorded" or "Recording in progress." Thereafter, at step 1006 the STB programming may add to the set further pointers to DVR content directory entries corresponding to those items for which the current user ID appears as a secondary user in the other information field 820 and status field 808 contains the status "Successfully recorded" or "Recording in progress." Next, at step 1008, the STB programming may determine if the DVR content display feature is operating in filtering or prioritizing mode. As described previously, in filtering mode only the DVR content attributable to the current user (and/or accessible by the current user) may be displayed. Accordingly, if the STB programming is operating in filtering mode, generation of DVR content directory pointers for use by a display routine, for example during the execution of step 520 of FIG. 5, is complete and processing ends.

If operating in prioritizing mode, at step 1010 the STB programming may next append additional DVR content directory pointers to the set created during steps 1004 and 1006 above, e.g., to display such additional DVR content at the end of the displayed DVR content directory, in a supplemental directory, etc. Such additional pointers may comprise the balance of the DVR content directory entries in chronological or alphabetical order, or any other ordering as appropriate for a particular embodiment. Thereafter, generation of an ordered list of DVR content pointers is complete and ready for use by a display routine, for example during the execution of step 520 of FIG. 5.

As also described above, a combination of prioritizing and filter may be employed whereupon a known user would be provided with a content listing in which the information in the content listing is prioritized considering recording requests made by that user, that user's content watching history, etc. while removing from the displaying listing of content those recorded programs that the user is not authorized to access, e.g., the rating is not within a ratings limit set for that user.

While various concepts have been described in detail, it will be appreciated by those skilled in the art that various modifications and alternatives to those concepts could be developed in light of the overall teachings of the disclosure. For example, while the illustrative embodiment presented above is implemented in an STB device, it will be appreciated that the inventive methods may be equally applied to any system in which available media content is to be listed or displayed to a user, including without limitation TV devices, personal computers, media servers, cloud-based media aggregation services, digital media receivers, etc. Furthermore, it will be appreciated that while the exemplary data structures of FIGS. 7 and 8 are presented in tabular form for ease of reference herein, in practice these may be implemented in various forms using any convenient data representation, for example a structured database, XML file, cloud-based service, etc., as appropriate for a particular embodiment.

Additionally, it will be appreciate that the methods of the instant invention may be combined with other program guide display techniques—for example, a user may define an explicit list of favorite channels to which the techniques described herein are to applied to the exclusion of other content, or conversely may define a list of preferred channels which are exempt for the prioritization process and will always be displayed; and/or the prioritization process may be applied to multiple genres of content, e.g., separate viewing histories may be maintained for individual categories such as sports, news, drama, comedy, etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents, patent applications, and other publications cited within this document are hereby incorporated by reference in their entirety.

What is claimed is:

1. A programming access device, comprising:
a first receiver adapted to receive programming from a first program content source;
a second receiver adapted to receive programming from a second program content source;
a memory; and
a processor coupled to each of the first receiver, the second receiver, and the memory;
wherein the memory stores instruction executable by the processor, the instructions, when executed by the processor, causing the programming access device to perform steps for providing each of a plurality of users with access to each program within a listing of a plurality of programs from a plurality of program content sources, the steps comprising:
responding to a request to display the listing of the plurality of programs received from a one of the plurality of users by automatically prioritizing the listing of the plurality of programs as a function of a one of the first program content source and the second program content source from which each of the plurality of programs is accessible and a viewing history data associated with the one of the plurality of users and causing the prioritized listing to be displayed on a display device associated with the programming access device;
wherein, regardless of the one of the plurality of users requesting display of the listing of the plurality of programs, each program within the listing of the plurality of programs remains accessible and every one of the plurality programs within the listing of programs is caused to be displayed on the display device in association with a graphical user interface element for use in causing the one of the plurality of programs to be displayed on the display device.

2. The programming access device as recited in claim 1, wherein the first program content source is an internet program content source and the second program content source is a cable program content source.

3. The programming access device as recited in claim 1, wherein the first program content source is an internet program content source and the second program content source is a digital video recorder content source.

4. The programming access device as recited in claim 1, wherein data indicative of the one of the plurality of users is embedded within the request.

5. The programming access device as recited in claim 4, wherein the data indicative of the one of the plurality of users comprises data that functions to identify a device from which the request originated.

6. The programming access device as recited in claim 1, wherein the listing of the plurality of programs is further prioritized as a function of a time stamp associated with the request and the viewing history data associated with the one of the plurality of users.

7. The programming access device as recited in claim 1, wherein the listing of the plurality of programs is further prioritized as a function of a genre associated with each of the plurality of programs and the viewing history data associated with the one of the plurality of users.

\* \* \* \* \*